D. F. LEONE.
WATER FEEDING ATTACHMENT.
APPLICATION FILED JAN. 29, 1912.
1,079,869.
Patented Nov. 25, 1913.
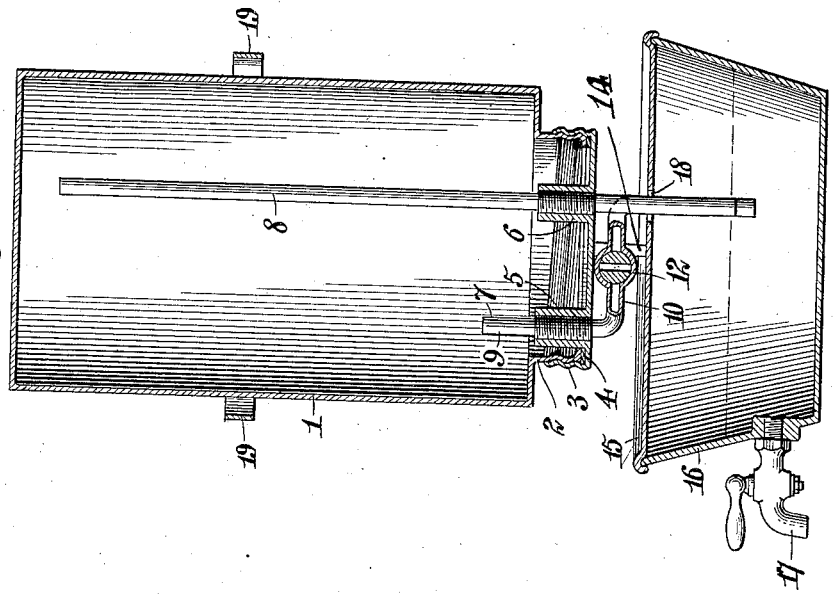
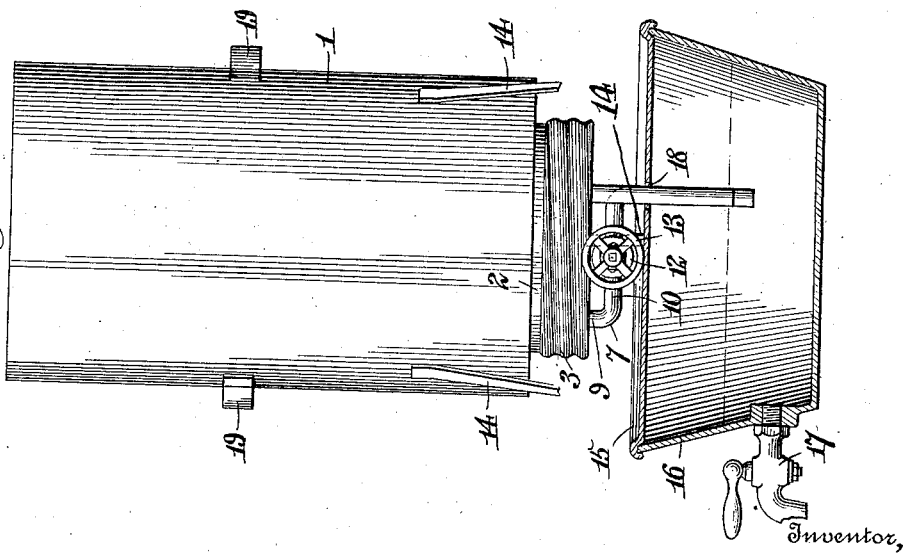
Witnesses:
Christ Feinle, Jr.
C. C. Hines.
Inventor,
Domnick F. Leone.

UNITED STATES PATENT OFFICE.

DOMNICK F. LEONE, OF ANACONDA, MONTANA.

WATER-FEEDING ATTACHMENT.

1,079,869.  Specification of Letters Patent.  Patented Nov. 25, 1913.

Application filed January 29, 1912.  Serial No. 674,227.

*To all whom it may concern:*

Be it known that I, DOMNICK F. LEONE, a subject of the King of Italy, residing at Anaconda, in the county of Deer Lodge and State of Montana, have invented new and useful Improvements in Water-Feeding Attachments, of which the following is a specification.

This invention relates to an attachment for automatically supplying liquid from a storage vessel or reservoir to a receptacle and maintaining the liquid in the latter at a predetermined level.

The object of the invention is to provide a simple, reliable and efficient apparatus of this character which is adapted for general use in supplying liquid in the manner described, which is also adapted for supplying hot water for domestic and other uses or for automatically replenishing a cooking vessel with water in order to prevent the vessel or its contents from being burned.

The invention consists of the features of construction, combination and arrangement of parts, hereinafter fully described and claimed, reference being had to the accompanying drawings, in which:—

Figure 1 is a side elevation of the apparatus as arranged for use for dispensing hot or cold water, the receptacle appearing in side elevation. Fig. 2 is a vertical transverse section through the apparatus as shown in Fig. 1.

Referring to the drawings, 1 designates a water storage tank or reservoir, which is of suitable size and capacity for the purpose and made of metal or other suitable material. This tank or reservoir is provided at its lower end with a depending contracted cylindrical extension or mouth 2 externally threaded to receive a closure cap 3. This cap is adapted to close the mouth of the vessel in an air tight manner, and if desired a gasket 4 of rubber or other suitable material may be applied between the mouth and cap in order to insure an absolutely air tight seal.

The cap 3 has secured thereto a pair of supporting members 5 and 6 in the form of collars having threaded bores, which bores are adapted for the passage of water discharge and air inlet pipes 7 and 8, which are suitably threaded to adjustably engage the threaded bores of the collars. The pipes are thus mounted upon and supported by the cap so as to be applicable to and removable therefrom.

The tank 1 is adapted to be filled with water, either hot or cold, through the mouth 2, which is then sealed by applying the cap, the water discharging through the pipe 7, and air entering the tank through the pipe 8 to fill the partial vacuum caused by the outflowing water and to permit of the discharge of the latter. The pipe 7 has a vertically disposed upper portion 9 extending upwardly into the tank a suitable distance above the bottom thereof, and is provided with a horizontal intermediate portion 10 extending below the cap and parallel therewith, and which terminates at its free end in a vertical discharge portion 11 projecting in parallel relation to and a short distance below the lower end of the pipe 8. A valve 12 having an outwardly projecting operating handle 13 is provided in the horizontal portion 10 of the discharge pipe for cutting off the discharge of water when the apparatus is not in use. The pipe 8 extends upwardly to a point adjacent the top of the tank 1, as shown.

The tank is provided at its bottom with supporting legs 14 to rest upon the removable lid or cover 15 of a receptacle 16, which may be provided with a discharge faucet 17. The lower ends of the discharge and air inlet pipes are adapted to depend into the said receptacle 16 through an opening 18 formed in the lid or cover and to supply liquid and to maintain the same therein at a predetermined level.

In using the attachment constituting the present invention the receptacle 16 is partly or entirely filled with water after which the cover 15 is placed in position. The tank 1 is partly or entirely filled with water and the cap then replaced. The tank 1 is then inverted and the two pipes 7 and 8 are inserted through the opening 18 until their lower ends become submerged in the water contained in the receptacle 16. Thus the water in receptacle 16 seals the pipes at their lower ends against the admission of air thereto and to the tank 1. Should the level of the liquid within the receptacle 16 fall below the lower end of the long pipe 8 as a result of evaporation or the withdrawal of any portion of the liquid through the valve 17, air will immediately enter the lower end of said pipe 8 and flow upwardly within the pipe so as thus to enter the upper portion of the tank 1 and permit a portion of the liquid contents of the tank to gravitate through the pipe 7 into the receptacle 16. This flow will continue until the level of the liquid in the receptacle 16 rises above the lower end of the pipe 8 whereupon the flow of air through the said pipe and into tank 1 will be cut off and further flow of liquid through pipe 7 to container 16 will cease. Obviously, therefore, liquid can be maintained constantly at a predetermined level within the receptacle 16. By extending pipe 7 upwardly into tank 1 as shown, the cool water in the bottom of the tank 1 will not be drained down into receptacle 16 but only the warmer water located above pipe 7 and below the upper end of pipe 8 will be free to drain into receptacle 16. Importance is attached to the fact that the cap 3 is supported by legs 14 above and out of contact with the cover 15 so that air is thus free to circulate between the tank 1 and the cover 15. This will prevent the contents of the tank 1 from reaching a boiling temperature. Furthermore, the reservoir or tank 1 is in the form of an inverted jar, can or the like, the screw cap of which is readily removable and carries air and water pipes which extend outwardly through the opening 18. Thus, parts can be removed easily for the purpose of cleaning and repairing them. As steam generated in the receptacle 16 is free to escape through the opening 18 and as steam will not generate within the tank or reservoir 1, there is no danger of an explosion such as might occur should the said tank be so located as to be heated to an undesirably high temperature while in use. In the drawings the receptacle 16 is in the form of any suitable utensil to be placed on a stove.

Having thus described the invention, what I claim as new is:

A device of the class described including a cover having an air inlet opening, said cover being adapted to be placed upon a receptacle, a reservoir above the cover, means for supporting the reservoir spaced from the cover, said reservoir being normally inverted and having a mouth depending therefrom, a screw cap engaging the mouth and constituting a closure therefor, an air inlet pipe extending through the screw cap and into the reservoir to a point near the top thereof and downwardly through the opening in the cover of the receptacle, said air inlet pipe being constantly open, a water discharge pipe extending through the screw cap, one end of said pipe being located adjacent the bottom of the reservoir and the other end portion being extended loosely through the opening in the cover and downwardly into the receptacle, a valve within the water discharge pipe for controlling the flow of liquid therethrough, and supporting members upon the screw cap and extending into the mouth, said members being detachably engaged by the respective pipes to hold the pipes adjustably connected to the screw cap.

In testimony whereof I affix my signature in presence of two witnesses.

DOMNICK F. LEONE.

Witnesses:
FRANK A. GARNER,
W. H. TRIPPET.

---

Copies of this patent may be obtained for five cents each, by addressing the "Commissioner of Patents, Washington, D. C."